(12) United States Patent
Parla et al.

(10) Patent No.: US 12,101,257 B2
(45) Date of Patent: Sep. 24, 2024

(54) DEMAND-BASED SCALING OF ENTERPRISE WORKLOADS INTO CLOUD NETWORKS

(71) Applicant: Cisco Technology, Inc., San Jose, CA (US)

(72) Inventors: Vincent E. Parla, North Hampton, NH (US); Kyle Andrew Donald Mestery, Woodbury, MN (US); Doron Levari, Newton, MA (US)

(73) Assignee: Cisco Technology, Inc., San Jose, CA (US)

( * ) Notice: Subject to any disclaimer, the term of this patent is extended or adjusted under 35 U.S.C. 154(b) by 294 days.

(21) Appl. No.: 17/681,079

(22) Filed: Feb. 25, 2022

(65) Prior Publication Data

US 2023/0275837 A1    Aug. 31, 2023

(51) Int. Cl.
*H04L 47/12* (2022.01)
*H04L 67/141* (2022.01)
*H04L 67/148* (2022.01)

(52) U.S. Cl.
CPC ............ *H04L 47/12* (2013.01); *H04L 67/141* (2013.01); *H04L 67/148* (2013.01)

(58) Field of Classification Search
CPC ..... H04L 47/12; H04L 67/141; H04L 67/148; H04L 65/1045; H04L 65/1069; H04L 67/1029; H04L 67/563; H04L 63/0272
See application file for complete search history.

(56) References Cited

U.S. PATENT DOCUMENTS

| 10,924,340 | B1 | 2/2021 | Iyengar et al. |
| 2007/0006218 | A1* | 1/2007 | Vinberg ............... G06F 9/45558 717/174 |
| 2011/0078303 | A1 | 3/2011 | Li et al. |
| 2012/0281708 | A1 | 11/2012 | Chauhan et al. |
| 2012/0303799 | A1 | 11/2012 | Hadas et al. |
| 2013/0346587 | A1* | 12/2013 | Barkett ................. G06Q 50/01 709/224 |
| 2015/0244693 | A1 | 8/2015 | Pate et al. |
| 2016/0212248 | A1 | 7/2016 | Samudrala et al. |
| 2016/0241633 | A1 | 8/2016 | Overby, Jr. et al. |
| 2021/0226998 | A1 | 7/2021 | Narayanaswamy et al. |
| 2022/0327003 | A1* | 10/2022 | Shankar ............... G06F 3/0679 |

FOREIGN PATENT DOCUMENTS

JP          2021087190 A       6/2021

* cited by examiner

*Primary Examiner* — Charles C Jiang
*Assistant Examiner* — Shawn D Miller
(74) *Attorney, Agent, or Firm* — Lee & Hayes, P.C.

(57) ABSTRACT

Techniques for scaling additional capacity for secure access solutions and other workloads of enterprise edge networks in and out of a cloud-computing network based on demand. The techniques may include determining that a capacity associated with a secure access node of an enterprise edge network meets or exceeds a threshold capacity. Based at least in part on the capacity meeting or exceeding the threshold capacity, the techniques may include causing a facsimile of the secure access node to be spun up on a cloud-computing network that is remote from the enterprise edge network. In this way, new connection requests received from client devices can be redirected to the facsimile of the secure access node. Additionally, or alternatively, one or more existing connections between client devices and the secure access node may be migrated to the facsimile of the secure access node in the cloud.

20 Claims, 7 Drawing Sheets

DEMAND-BASED SCALING OF ENTERPRISE WORKLOADS INTO CLOUD NETWORKS

TECHNICAL FIELD

The present disclosure relates generally to techniques for, among other things, elastically scaling additional workload capacity in and out of a cloud-computing network for on premise enterprise workloads based on increases or decreases in demand.

BACKGROUND

Cloud-delivered workload solutions for enterprises are growing in popularity and utilization due to the ease in which these solutions can be scaled based on demand. However, enterprise edge networks are still important to those enterprises who have already made substantial investments in their edge resources and appliances. Additionally, some enterprises still have a substantial amount of private applications on premise that require some form of secure access. With more of the workforce being remote, the need for a scalable and elastic solution is more important than ever in order to prevent over-subscribing or under-utilizing these workload solutions. As a result, many enterprises are stuck with a decision as to whether they should move entirely to a cloud delivered solution or if they should invest in and deploy additional physical appliances at their campus to boost on-premise capacity.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
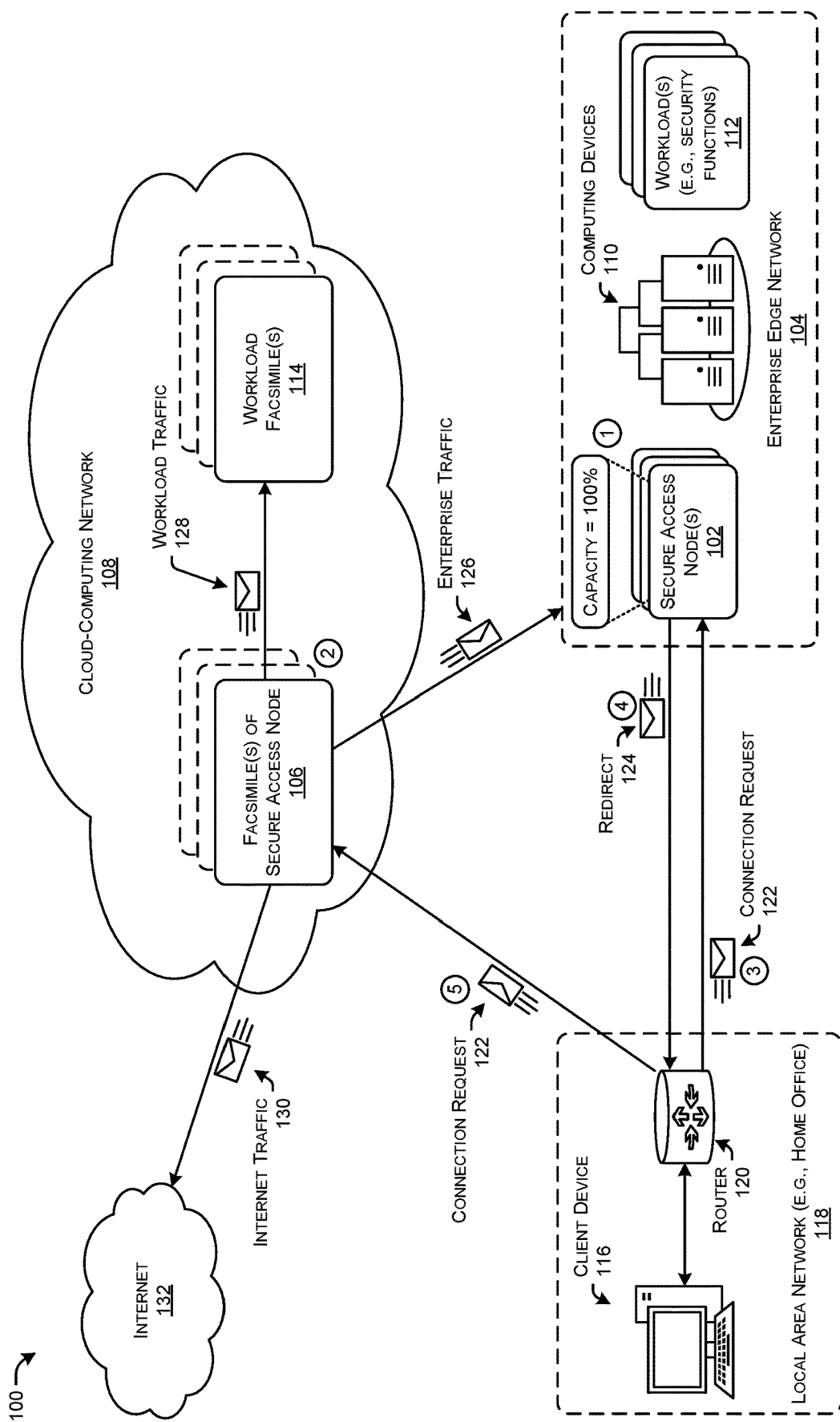
FIG. 1 illustrates an example architecture that may be used to implement various aspects of the technologies described herein. In the illustrated example, the on-premise secure access node of the enterprise edge network is over-subscribed and, in response, a facsimile of the secure access node is spun-up in the cloud and new connections are redirected to the facsimile secure access node.

This disclosure describes various technologies for demand-based scaling of on-premise enterprise workloads in and out of a cloud-computing network. By way of example, and not limitation, a method according to the technologies described herein may include running a first workload on one or more devices of an enterprise edge network and determining that a capacity associated with the first workload meets or exceeds a threshold capacity. In some examples, the first workload may be associated with a security function or a secure access solution. In some examples, the techniques may include receiving, from a client device, a request to establish a connection between the client device and the first workload. Based at least in part on the capacity meeting or exceeding the threshold capacity, the client may be redirected to establish the connection with a second workload that is hosted on a cloud-computing network. That is, the second workload may be a facsimile of the first workload but running on the cloud-computing network remotely from the enterprise edge network.

Additionally, the techniques described herein may be performed as a method and/or by a system having non-transitory computer-readable media storing computer-executable instructions that, when executed by one or more processors, performs the techniques described above.

Example Embodiments

As discussed above, cloud-delivered security solutions are growing in popularity due to the ease in which these solutions can be scaled based on demand. However, enterprises who have already made substantial investments in their edge network resources would like to make use of those resources, and some enterprises still have a substantial amount of private applications on premise that require some form of secure access. With more of the workforce being remote, the need for scalable and elastic security solutions are more important than ever and, as a result, many enterprises are stuck with a decision to either move entirely to a cloud-delivered solution or, instead, invest in and deploy additional appliances at their campus to boost on-premise capacity.

Accordingly, this disclosure is directed to technologies for elastically scaling additional capacity in and out of the cloud for on-premise, enterprise workloads (e.g., secure access solutions, for instance) based on demand. For example, a determination may be made that a capacity associated with a workload (e.g., secure access node, security function, etc.) meets or exceeds a threshold capacity. The workload may be running on devices/appliances of an enterprise edge network. In some examples, the workload may be a secure access node (e.g., virtual private network (VPN) terminator, reverse or forward proxy, or the like), a security function (e.g., IPS, firewall, etc.), or any other workload that may be run using the enterprise edge appliances. In some examples, based at least in part on the determination of the capacity meeting or exceeding the threshold capacity, a facsimile of the workload may be spun up and ran on resources of a cloud-computing network that is remote from the enterprise edge network. In this way, new connection requests received from client devices may be redirected to be established with the workload facsimile. Additionally, or alternatively, existing connection(s) with the on-premise workload may be migrated to the facsimile of the secure access node in the cloud. In some examples, when the capacity of the workload reduces below the threshold capacity, the connections to the workload facsimile may be migrated back to the on-premise workload. Similarly, new connection requests may be made with the on-premise workload, instead of redirected the traffic to the facsimile workload.

In some examples, the techniques described herein may be used for virtual private networking (VPN), zero-trust networking (ZTN), reverse/forward proxy technologies, or the like. For instance, in some examples a cloud monitor may measure the capacities of on-premise appliances of the enterprise edge network. In some examples, the monitor may use machine-learning techniques to make an elastic-expansion decision prior to an appliance reaching actual capacity. For instance, the monitor may anticipate exhaustion of the appliance's resources used for running a workload based on current utilization data, historical utilization data, a time of day, a day of the week, or the like. In this way, when an on-premise device has reached/neared capacity, an elastic expansion into the cloud from the on-premise component may be made.

In some examples, an orchestration system may detect the capacity issue and collect up configuration information from the on-premise system appliance(s). Based at least in part on this configuration information, the orchestration system may spin up new instance(s) of the workload/secure access node in the cloud and replicate the configuration of on-premise policies. For instance, firewall policies, VPN policies, reverse proxy policies, etc. can all be orchestrated as needed in the cloud expansion system.

Once the orchestrated system is operationalized in the cloud, new end user sessions can be redirected to the cloud instance(s) of the workload/secure access node using domain name system (DNS) redirects, hypertext transfer protocol (HTTP) redirects, clustering or load-balancing techniques, or any similar method. Additionally, in some examples, existing end user sessions may be migrated to the cloud node instead of the on-premise node they were previously connected to. In some examples, the moving of new end user sessions to the cloud may happen during the authentication phase. However, nothing prevents existing end user sessions from being moved midstream if the appropriate state-fulness is moved from the on-premise node to the cloud node (e.g., the user could be moved to the cloud while an active VPN tunnel is established, with zero packet loss, if orchestrated correctly between the components). In some examples, to reduce the utilization of the on-premise systems, a portion of the existing connections may be migrated to the cloud and/or new sessions may be redirected to the expansion in the cloud.

Additionally, in some examples the techniques may migrate active end user sessions back from the cloud to the on-premise systems when the on-premise appliances have sufficient capacity to take back sessions. For instance, a garbage collection (GC) type of system may be used to collapse down multiple orchestrated cloud nodes as sessions on each node reaches a threshold that would benefit from GC consolidation techniques. This GC system may include consolidating that may result in session migration back to on-premise appliances when sufficient capacity is available again on the on-premise node(s).

As noted above, this disclosure describes techniques for elastically expanding the capacity of on-premise (e.g., enterprise edge) secure access nodes in and out of a cloud-computing network based on demand. The disclosed technique, however, are not limited to secure access solutions, and the techniques may be used for elastic expansion of any on-premise workload that is being run on appliances of the enterprise network and at any location of the enterprise network (e.g., not just the edge). By way of example, and not limitation, a method according to the technologies described herein may include determining that a capacity associated with a secure access node of an enterprise edge network meets or exceeds a threshold capacity. In some examples, the threshold capacity may be set by an administrator of the enterprise edge network. Additionally, or alternatively, the threshold capacity may be determined using machine-learning techniques, based on a utilization history of the secure access node, based on an amount of available resources of the secure access node (e.g., bandwidth, compute, etc.), and/or the like.

In some examples, a monitoring component (e.g., of the secure access node, the cloud, the enterprise edge, etc.) may determine that the secure access node is at exceeding, at, or near capacity. For instance, the monitoring component may store utilization data associated with the secure access node. The utilization data may be indicative of the utilization history associated with the secure access node. In some examples, the utilization history may indicate previous capacities of the secure access node(s) at previous periods of time. For instance, the utilization history may indicate historical times of a day, a week, a month, etc. during which the secure access node was over-subscribed, under-utilized, etc. Additionally, in some examples, the monitoring component may receive capacity data indicating a current (e.g., present) capacity of the secure access node. In this way, the monitoring component may determine that the capacity meets or exceeds the threshold capacity based at least in part on the utilization data and the capacity data.

In some examples, the monitoring component may utilize machine-learning techniques to determine that the capacity is near, at, or exceeding the threshold capacity. For instance, the monitoring component may input the current capacity data into a machine-learned model, and an output of the machine-learned model may indicate whether the capacity meets or exceeds the threshold capacity. The machine-learned model may be trained, in some examples, using the utilization history data. In some examples, the threshold capacity may change at different times as more or less resources are available for use by the secure access node(s) of the enterprise edge.

In some examples, the method may include causing a facsimile of the secure access node to be hosted on resources of a cloud-computing network that is remote from the enterprise edge network. For instance, the monitoring component (or the secure access node itself) may spin-up the facsimile on the cloud-computing network based at least in part on the capacity meeting or exceeding the threshold capacity. In some examples, the facsimile may be spun up in anticipation of the secure access node becoming oversubscribed. In some examples, when the facsimile is spun up a configuration or a networking policy associated with the secure access node may be replicated on the facsimile of the secure access node. For instance, the monitoring component may replicate the configuration of on-premise policies (e.g., firewall policies, VPN policies, reverse proxy policies, etc.) when spinning up the facsimile of the secure access node.

In some examples, based at least in part on the facsimile secure access node being spun up on the cloud-computing network, new connection requests received at the on-premise secure access node may be redirected to the facsimile secure access node. For instance, a new connection request received from a client device may be redirected such that the new connection is established between the client device and the facsimile of the secure access node. Additionally, or alternatively, one or more existing connections between client devices and the on-premise secure access node may be migrated to the facsimile of the secure access node in the cloud. In this way, the likelihood of the on-premise appliances becoming over-subscribed can be reduced. Additionally, if the on-premise appliances do become over-subscribed, additional existing connections with the on-premise secure access node(s) can be migrated to the facsimile secure access node in the cloud. In some examples, the facsimile secure access node(s) in the cloud can be scaled (e.g., expanded or minimized) based on demand. In some examples, the connections can be one or more of virtual private network (VPN) connections, Zero Trust Networking (ZTN) connections, reverse proxy connections, forward proxy connections, or the like.

Additionally, in some examples, a determination may be made that the capacity of the on-premise secure access node(s) is at less than the threshold capacity (e.g., under-utilized). Based at least in part on the capacity being less than the threshold capacity, connections between client devices and the facsimile (s) of the secure access node may be migrated back to the on-premise secure access node(s). Additionally, or alternatively, new connections (e.g., new incoming connections) may be made with the on-premise secure access node, instead of redirecting the new connections to the facsimile node in the cloud. In this way, the cloud resources may be scaled down to minimize cost, and the utilization of the on-premise resources can be maximized.

In some examples, when the on-premise appliances are over-subscribed or under-utilized and connections need to be moved, the techniques described herein may vary between redirecting new connections and migrating old connections. Take, for example, a scenario in which the on-premise appliances are approaching their threshold capacity during a period of time in which enterprise traffic is predicted to be higher than average. In such a scenario, the system may begin by redirecting all new connections to the facsimile nodes in the cloud. However, if the capacity of the on-premise appliance(s) continue to decrease (over-subscribe), then the system may begin migrating a portion of the existing connections to the on-premise appliances to the cloud in order to avoid over-subscribing. As another example, imagine a scenario in which there are existing connections with both of the on-premise nodes and the facsimile nodes in the cloud, and an existing connection to the on-premise nodes is terminated, increasing the capacity of the on-premise appliances. Instead of migrating an existing connection from the cloud facsimile nodes back to the on-premise nodes, the system may make a determination to save space on the on-premise nodes for a new, incoming connection and maintain the connections with the facsimile nodes in the cloud.

According to the techniques described herein, several improvements in computer-related technology can be realized. For instance, the techniques described herein allow for enterprises to expand their workloads into a scalable cloud-computing network. This allows enterprises to utilize their edge appliances, which they have invested in, without having to purchase additional, physical appliances to meet demands. Additionally, the disclosed techniques can be used to allow access to private applications on-premise that require some form of secure access. In other words, if an enterprise decided to move entirely to a cloud infrastructure, secure access to the edge would still be necessary to access these private, on-premise applications. Other improvements in computer-related technology will be easily apparent to those having ordinary skill in the art.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that may be used to implement various aspects of the technologies described herein. In the illustrated example, the on-premise secure access node(s) 102 of the enterprise edge network 104 is/are over-subscribed (100% capacity) and, in response, one or more facsimile(s) 106 of the secure access node 102 is/are spun-up in the cloud-computing network 108 and new connections are redirected to the facsimile(s) 106.

In some examples, the enterprise edge network 104 may include one or more computing devices 110, such as servers, networking devices, or other devices. The enterprise edge network 104 may also include the one or more secure access node(s) 102, which may be standalone devices or running as workloads on the computing devices 110. In some examples, the secure access node(s) 102 may be VPN endpoints, ZTN endpoints, reverse proxies, forward proxies, or other secure access solutions. The computing devices 110 may, additionally, run one or more other workload(s) 112, such as security functions (e.g., firewalls, IPS, etc.).

In examples, the devices of the enterprise edge network 104 may spin up facsimiles on the cloud-computing network 108 based on demand. For instance, the facsimile(s) 106 of the secure access node(s) 102 may be spun up on the cloud-computing network, as well as the workload facsimile (s) 114, which may be facsimiles of the workload(s) 112. In this way, the devices, nodes, and workloads of the enterprise edge network 104 may expand their capacity into the cloud-computing network 108 in order to meet demands.

In some examples, client devices of remote or branch networks, such as the client device 116 of the local area network 118 (e.g., the home office network), may connect with the enterprise edge network 104 via the one or more secure access node(s) 102. In some examples, the local are network 118 may include a router 120 (e.g., a Wi-Fi router) for providing the client device 116 with network connectivity and packet routing.

Also shown in FIG. 1 are various example operations associated with the techniques described herein for elastically expanding capacity into a cloud-computing network. At operation "1," the secure access node(s) 102 may determine that their capacity meets or exceeds a threshold capacity (e.g., over-subscribed). At "2," based at least in part on the determination that the secure access node(s) 102 capacity meets or exceeds the threshold capacity, the facsimile(s) 106 of the secure access node(s) 102 may be spun up and ran on the cloud-computing network 108.

At "3," the client device 116 may send a connection request 122 to the enterprise edge network 104. The connection request 122 may be a request to establish a VPN or other encrypted connection between the client device 116 and the secure access node(s) 102. The secure access node(s) 102 may receive this connection request 122 packet(s). At "4," based at least in part on being over-subscribed, the secure access node(s) 102 may send a redirect 124 packet (e.g., DNS redirect, HTTP redirect, or the like) to cause the client device 116 (or the router 120) to send the connection request 122 to the facsimile(s) 106 of the secure access node 102. At "5," the connection request 122 is forwarded to the facsimile(s) 106 of the secure access node 102 that are running on the cloud-computing network 108.

After the connection is established between the client device 116 and the facsimile 106 of the secure access node 102, the client device 116 may send traffic to one or more endpoints over the connection. For instance, enterprise traffic 126 may be sent back to the enterprise edge network 126 over the connection, workload traffic 128 may be sent to the one or more workload facsimile(s) 114 over the connection (as well as the workload(s) 112 running at the enterprise edge), and internet traffic 130 may be sent to the internet 132 over the connection.

Figure 2:
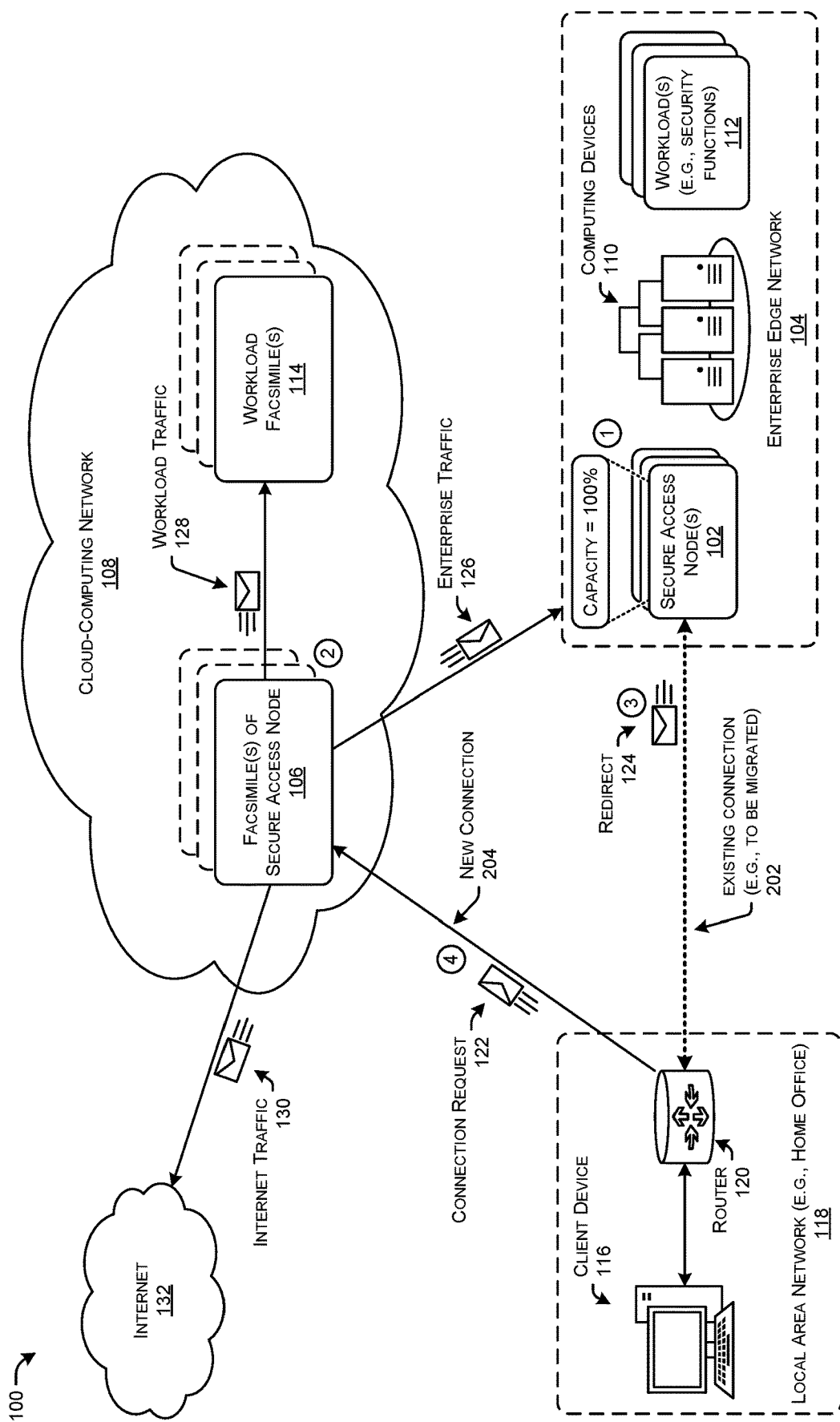
FIG. 2 illustrates an example in which an existing connection to an oversubscribed secure access node is migrated to a facsimile of the secure access node running in a cloud-based network.

FIG. 2 illustrates an example in which an existing connection 202 to an oversubscribed secure access node 102 of an enterprise edge network 104 is migrated to a facsimile 106 of the secure access node 102 that is running in a cloud-computing network 108. At operation "1," the secure access node(s) 102 may determine that their capacity meets or exceeds a threshold capacity (e.g., over-subscribed). Based at least in part on the determination that the secure access node(s) 102 capacity meets or exceeds the threshold capacity, at "2," the facsimile(s) 106 of the secure access node(s) 102 may be spun up and ran on the cloud-computing network 108.

At "3," based at least in part on being over-subscribed, the secure access node(s) 102 may send a redirect 124 packet to cause the client device 116 (or the router 120) to migrate the existing connection 202 and establish a new connection 204 with the facsimile(s) 106 of the secure access node 102. At "4," the connection request 122 is sent to the facsimile(s) 106 of the secure access node 102 that are running on the cloud-computing network 108. In some examples, when migrating the connection, the secure access node(s) 102 may send a session cookie to the client device 116 so that the client device 116 may resume its session on the cloud resources. In this way, the migration of the connection may be transparent to the end user of the client device 116 so that the end user is unaware of the migration.

Figure 3:
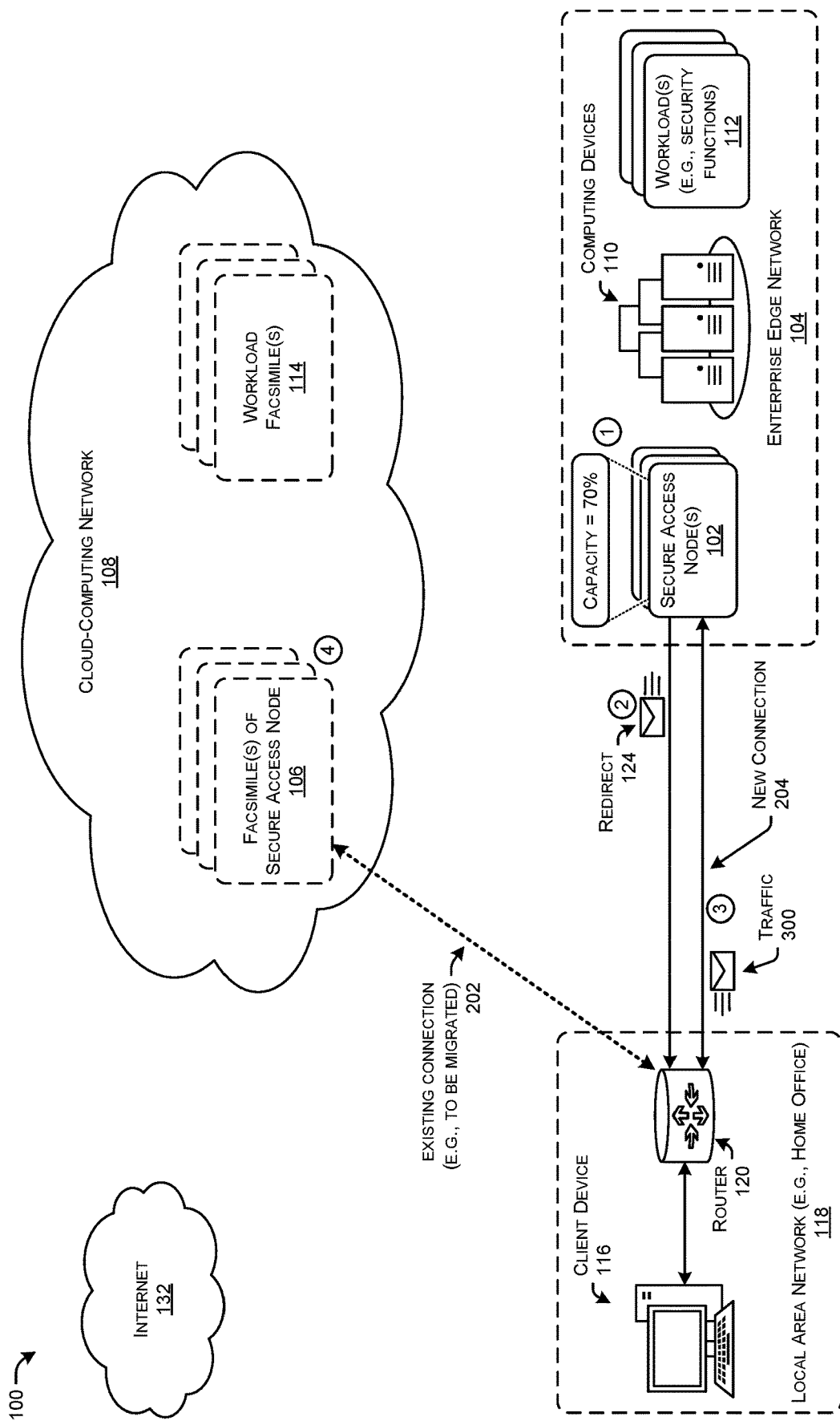
FIG. 3 illustrates an example in which an on-premise secure access node is under-utilized and, in response, an existing connection with a facsimile of the secure access node in the cloud is migrated to the on-premise secure access node of the enterprise edge network.

FIG. 3 illustrates an example in which an on-premise secure access node 102 is under-utilized and, in response, an existing connection 202 with a facsimile 106 of the secure access node 102 in the cloud is migrated to the on-premise secure access node 102 of the enterprise edge network 104. At operation "1," the secure access node(s) 102 may determine that their capacity is less than the threshold capacity (e.g., under-utilized). Based at least in part on the determination that the secure access node(s) 102 capacity is less than the threshold capacity, the secure access node(s) 102 may determine to migrate the existing connection 202 back to the enterprise edge network 104.

At "2," the secure access node(s) 102 may send the redirect 124 to the client device 116 to cause the client device 116 (or the router 120) to migrate the existing connection 202 and establish a new connection 204 wit the secure access node 102. In some examples, the redirect 124 may include a session cookie for use in re-establishing any open sessions that the client device 116 may have (e.g., open applications, open workload(s), etc.). At "3," once the new connection 204 is established, the client device 116 may send and receive traffic 300 to and from the enterprise edge network 104 via the new connection 204. At "4," if no more connections exist between client devices and the facsimile(s) 106 of the secure access node(s) 102, then the facsimile(s) 106 may be removed from running on the cloud-computing network 108.

Figure 4:
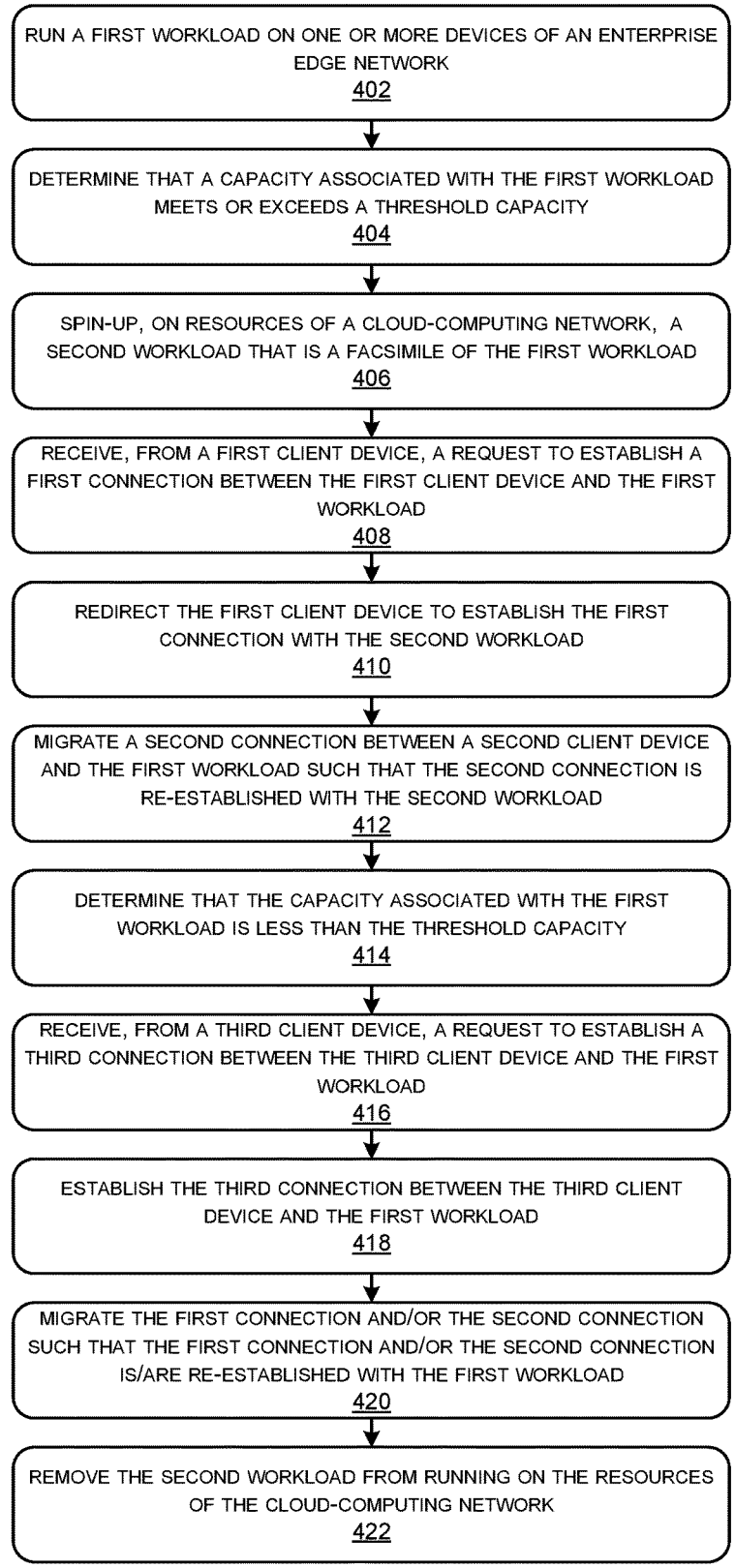
FIG. 4 is a flow diagram illustrating an example method associated with scaling a workload that is running on-premise to a cloud-computing network based on demand.
Figure 5:
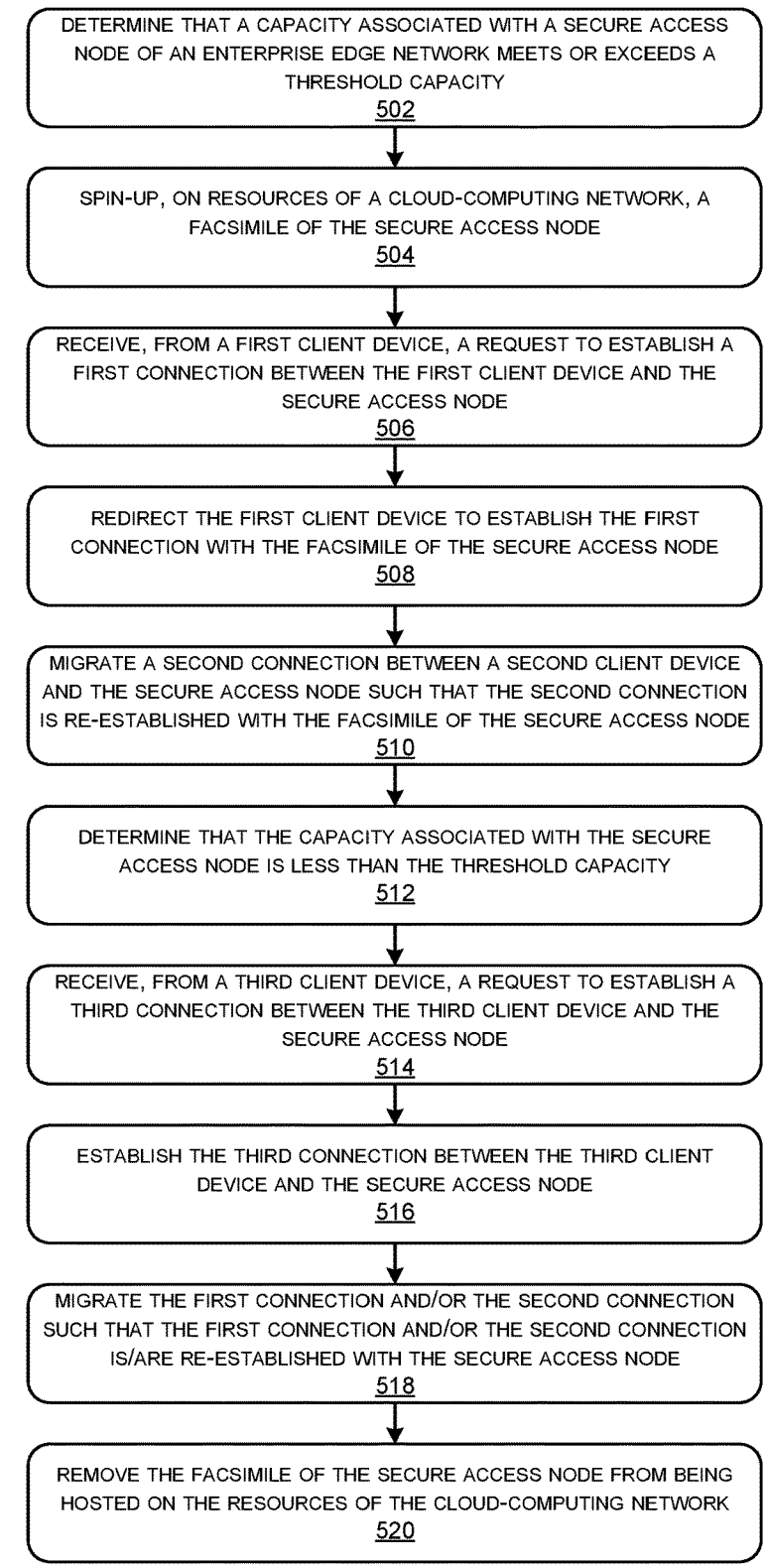
FIG. 5 is a flow diagram illustrating an example method associated with scaling a secure access node of an enterprise network.

FIGS. 4 and 5 are flow diagrams illustrating example methods 400 and 500 according to the techniques described herein. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 is a flow diagram illustrating an example method 400 associated with scaling a workload that is running on-premise to a cloud-computing network based on demand. The method 400 begins at operation 402, which includes running a first workload on one or more devices of an enterprise edge network. For instance, the one or more workloads 112 may be run on the computing devices 110 of the enterprise edge network 104. In some examples, the first workload may be configured as a secure access node (e.g., a VPN terminator, a reverse/forward proxy, or another secure access solution).

At operation 404, the method 400 includes determining that a capacity associated with the first workload meets or exceeds a threshold capacity. In some examples, a monitoring component (e.g., of the cloud-computing network, the enterprise edge network, etc.) may determine that the capacity of the first workload meets or exceeds the threshold capacity. For instance, the monitoring component may store utilization data associated with the workload or the resources that the workload is running on. The utilization data may be indicative of the utilization history associated with the first workload. In some examples, the utilization history may indicate previous capacities of the first workload at previous periods of time. For instance, the utilization history may indicate historical times of a day, a week, a month, etc. during which the first workload was over-subscribed, under-utilized, etc. Additionally, in some examples, the monitoring component may receive capacity data indicating a current (e.g., present) capacity of the first workload. In this way, the monitoring component may determine that the capacity meets or exceeds the threshold capacity based at least in part on the utilization data and the capacity data.

In some examples, the monitoring component may utilize machine-learning techniques to determine that the capacity is near, at, or exceeding the threshold capacity. For instance, the monitoring component may input the current capacity data into a machine-learned model, and an output of the machine-learned model may indicate whether the capacity meets or exceeds the threshold capacity. The machine-learned model may be trained, in some examples, using the utilization history data. In some examples, the threshold capacity may change at different times as more or less resources are available for use by the workload(s) of the enterprise edge.

At operation 406, the method 400 includes spinning-up, on resources of a cloud-computing network, a second workload that is a facsimile of the first workload. For instance, the workload facsimile 114 may be spun up on resources of the cloud-computing network 108. In some examples, the monitoring component (or the workload itself) may spin-up the facsimile on the cloud-computing network based at least in part on the capacity meeting or exceeding the threshold capacity. In some examples, the facsimile may be spun up in anticipation of the workload or the resources that the workload is running on becoming oversubscribed. In some examples, when the facsimile is spun up a configuration associated with the workload may be replicated on the workload facsimile.

At operation 408, the method 400 includes receiving, from a first client device, a request to establish a first connection between the first client device and the first workload. In some examples, the first connection may be a VPN connection, a ZTN connection, a reverse or forward proxy connection, or another encrypted connection. At operation 410, the method 400 includes redirecting the first client device to establish the first connection with the second workload. In some examples, the first client may be redirected based at least in part on the capacity of the first workload meeting or exceeding the threshold capacity. By redirecting the first client device to establish the connection with the second workload, the capacity of the first workload will not decrease further or become more over-subscribed.

At operation 412, the method 400 includes migrating a second connection between a second client device and the first workload such that the second connection is re-established with the second workload. In some examples, the second connection may be an existing connection. In some examples, the second connection may be migrated based at least in part on the capacity of the first workload meeting or exceeding the threshold capacity. In some examples, multiple existing connections may be migrated until the capacity of the workload is less than the threshold. By migrating the second connection, the capacity of the first workload may increase (e.g., become less constrained).

At operation 414, the method 400) includes determining that the capacity associated with the first workload is less than the threshold capacity. For instance, the monitoring component may determine that the capacity associated with the first workload is less than the threshold capacity or nearing less than the threshold capacity. For example, the monitoring component may determine that the end of a workday is approaching, and that connections with the first workload are likely to be terminated.

At operation 416, the method 400 includes receiving, form a third client device, a request to establish a third connection between the third client device and the first workload. At operation 418, the method 400 includes establishing the third connection between the third client device and the first workload. For instance, the third connection may be established based at least in part on the capacity of the first workload being less than the threshold capacity.

At operation 420, the method 400 includes migrating the first connection and/or the second connection such that the first connection and/or the second connection is/are re-established with the first workload. In some examples, the first connection and/or the second connection may be migrated based at least in part on the capacity of the first workload being less than the threshold capacity.

At operation 422, the method 400 includes removing the second workload from running on the resources of the cloud-computing network. For instance, once no more connections are in place with the second workload, the second workload may be removed from running on the cloud-computing network to save money, resources, etc. In some examples, a capacity of the first workload may need to be less than a threshold capacity for a specified period of time or magnitude before the second workload may be removed. That is, the system may include functionality for making an informed decision as to whether or not the second workload may need to be used again before taking the second workload offline.

FIG. 5 is a flow diagram illustrating an example method 500 associated with scaling a secure access node of an enterprise network. The method 500 begins at operation 502, which includes determining that a capacity associated with a secure access node of an enterprise edge network meets or exceeds a threshold capacity. In some examples, a monitoring component (e.g., of the cloud-computing network, the enterprise edge network, the secure access node, etc.) may determine that the capacity of the secure access node meets or exceeds the threshold capacity. For instance, the monitoring component may store utilization data associated with the secure access node. The utilization data may be indicative of the utilization history associated with the secure access node. In some examples, the utilization history may indicate previous capacities of the secure access node(s) at previous periods of time. For instance, the utilization history may indicate historical times of a day, a week, a month, etc. during which the secure access node was over-subscribed, under-utilized, etc. Additionally, in some examples, the monitoring component may receive capacity data indicating a current (e.g., present) capacity of the secure access node. In this way, the monitoring component may determine that the capacity meets or exceeds the threshold capacity based at least in part on the utilization data and the capacity data.

In some examples, the monitoring component may utilize machine-learning techniques to determine that the capacity is near, at, or exceeding the threshold capacity. For instance, the monitoring component may input the current capacity data into a machine-learned model, and an output of the machine-learned model may indicate whether the capacity meets or exceeds the threshold capacity. The machine-learned model may be trained, in some examples, using the utilization history data. In some examples, the threshold capacity may change at different times as more or less resources are available for use by the secure access node of the enterprise edge.

At operation 504, the method 500 includes spinning-up, on resources of a cloud-computing network, a facsimile of the on-premise secure access node. For instance, the facsimile(s) 106 of the secure access node(s) 102 be spun up on resources of the cloud-computing network 108. In some examples, the monitoring component (or the workload itself) may spin-up the facsimile on the cloud-computing network based at least in part on the capacity meeting or exceeding the threshold capacity. In some examples, the facsimile may be spun up in anticipation of the secure access node becoming oversubscribed. In some examples, when the facsimile is spun up a configuration associated with the secure access node may be facsimile-replicated on the facsimile.

At operation 506, the method 500 includes receiving, from a first client device, a request to establish a first connection between the first client device and the secure access node. In some examples, the first connection may be a VPN connection, a ZTN connection, a reverse or forward proxy connection, or another encrypted connection. At operation 508, the method 500 includes redirecting the first client device to establish the first connection with the facsimile of the secure access node. In some examples, the first client may be redirected based at least in part on the capacity of the on-premise secure access node meeting or exceeding the threshold capacity. By redirecting the first client device to establish the connection with the facsimile of the secure access node, the capacity of the on-premise secure access node will not decrease further or become more over-subscribed.

At operation 510, the method 500 includes migrating a second connection between a second client device and the secure access node such that the second connection is re-established with the facsimile of the secure access node. In some examples, the second connection may be an existing connection. In some examples, the second connection may be migrated based at least in part on the capacity of the on-premise secure access node meeting or exceeding the threshold capacity. In some examples, multiple existing connections may be migrated until the capacity of the on-premise secure access node is less than the threshold. By migrating the second connection, the capacity of the on-premise secure access node may increase (e.g., become less constrained).

At operation 512, the method 500 includes determining that the capacity associated with the secure access node is less than the threshold capacity. For instance, the monitoring component may determine that the capacity associated with the on-premise secure access node is less than the threshold capacity or nearing less than the threshold capacity. For example, the monitoring component may determine that the end of a workday is approaching, and that active connections with the on-premise secure access node are likely to be terminated.

At operation 514, the method 500 includes receiving, form a third client device, a request to establish a third connection between the third client device and the secure access node. At operation 516, the method 500 includes establishing the third connection between the third client device and the secure access node. For instance, the third connection may be established based at least in part on the capacity of the on-premise secure access node being less than the threshold capacity.

At operation 518, the method 500 includes migrating the first connection and/or the second connection such that the first connection and/or the second connection is/are re-established with the secure access node. In some examples, the first connection and/or the second connection may be migrated based at least in part on the capacity of the on-premise secure access node being less than the threshold capacity.

At operation 520, the method 500 includes removing the facsimile of the secure access node from being hosted on the resources of the cloud-computing network. For instance, once no more connections are in place with the facsimile secure access node, the facsimile may be removed from running on the cloud-computing network to save money, resources, etc. In some examples, a capacity (e.g., number of connections, available bandwidth, available compute, etc.) of the on-premise secure access node may need to be less than a threshold capacity for a specified period of time or magnitude before the facsimile secure access node may be removed. That is, the system may include functionality for making an informed decision as to whether or not the facsimile secure access node may need to be used again before taking the facsimile node offline.

Figure 6:
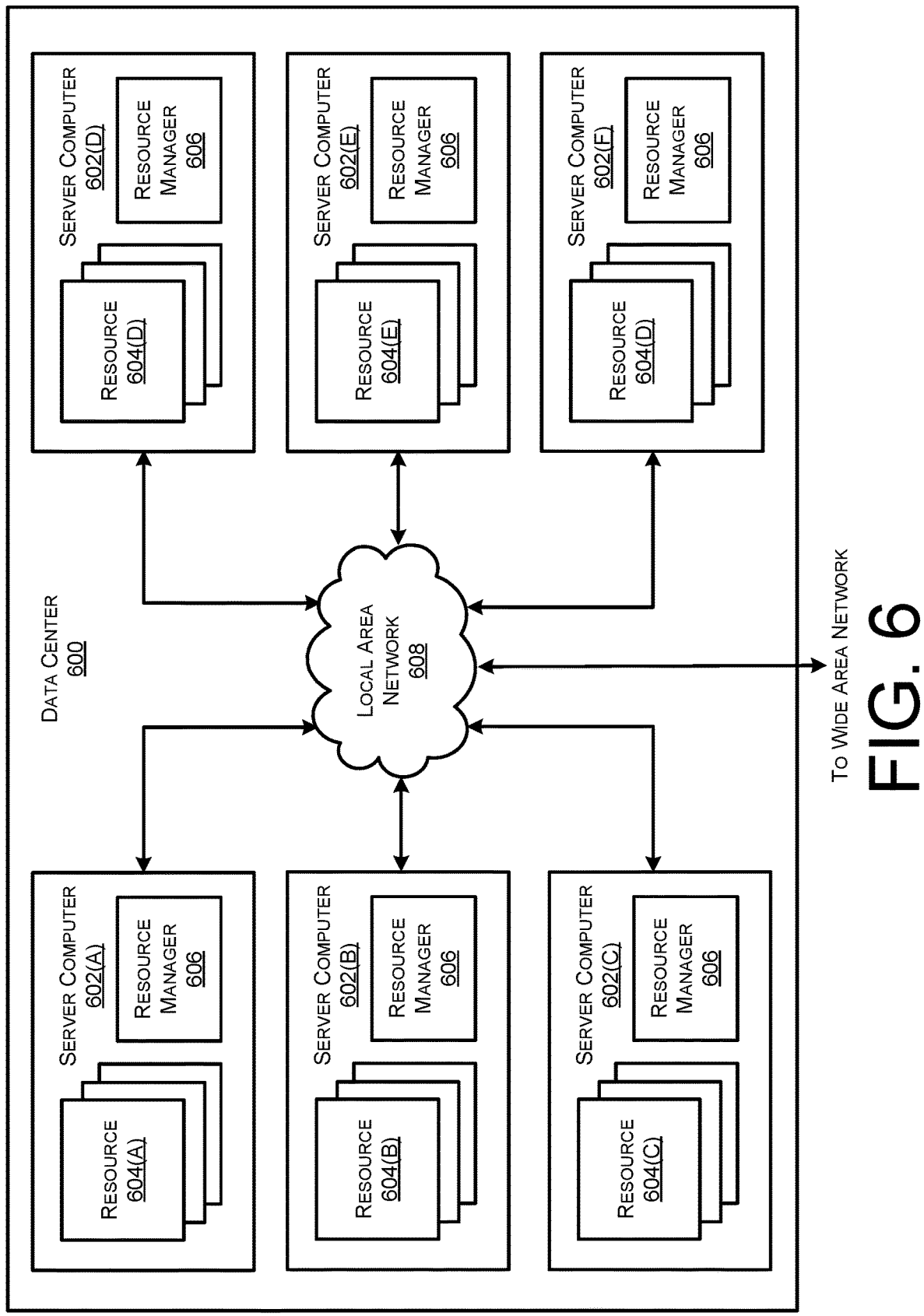
FIG. 6 is a computing system diagram illustrating an example configuration of a data center that can be utilized to implement aspects of the technologies disclosed herein.

FIG. 6 is a computing system diagram illustrating an example configuration of a data center 600 that can be utilized to implement aspects of the technologies disclosed herein. The example data center 600 shown in FIG. 6 includes several server computers 602A-602F (which might be referred to herein singularly as "a server computer 602" or in the plural as "the server computers 602") for providing computing resources. In some examples, the resources and/or server computers 602 may include, or correspond to, any type of networked devices or nodes described herein. Although described as servers, the server computers 602 may comprise any type of networked device, such as servers, switches, routers, hubs, bridges, gateways, modems, repeaters, access points, etc. In some examples, the example data center 600 may correspond with the cloud-computing network 108 and/or the enterprise edge network 104 described herein.

The server computers 602 can be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, security, packet inspection, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate local area network (LAN) 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 602A-602F in each data center 600, and, potentially, between computing resources in each of the server computers 602. It should be appreciated that the configuration of the data center 600 described with reference to FIG. 6 is merely illustrative and that other implementations can be utilized.

In some examples, the server computers 602 may each execute one or more application containers and/or virtual machines to perform techniques described herein. In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like. The computing resources 604 may be utilized to run instances of secure access nodes or other workloads.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, secure access points, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
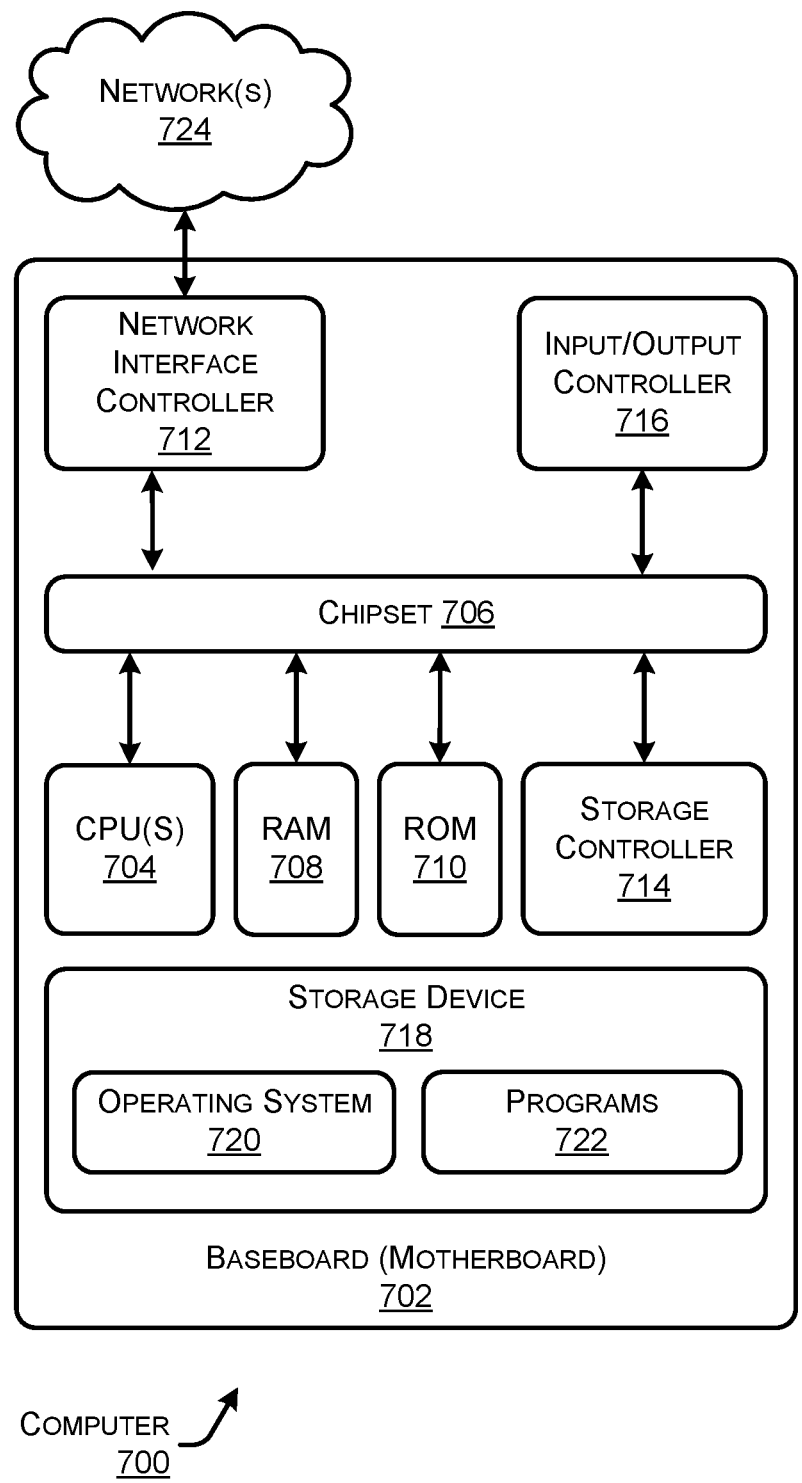
FIG. 7 is a computer architecture diagram showing an illustrative computer hardware architecture for implementing a computing device that can be utilized to implement aspects of the various technologies presented herein.

FIG. 7 is a computer architecture diagram showing an illustrative computer hardware architecture for implementing a computing device that can be utilized to implement aspects of the various technologies presented herein. The computer architecture shown in FIG. 7 illustrates a conventional server computer, network node (e.g., secure access node), router, workstation, desktop computer, laptop, tablet, network appliance, e-reader, smartphone, load balancer, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the internet 132, the cloud-computing network 108, the enterprise edge network 104, the local area network 118, or the like. The chipset 706 can include functionality for providing network connectivity through a NIC 712, such as a gigabit Ethernet adapter. The NIC 712 is capable of connecting the computer 700 to other computing devices over the network 724. It should be appreciated that multiple NICs 712 can be present in the computer 700, connecting the computer to other types of networks and remote computer systems. In some examples, the NIC 712 may be configured to perform at least some of the techniques described herein.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface. a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the architecture 100 and or any components included therein, may be supported by one or more devices similar to computer 700. Stated otherwise, some or all of the operations performed by the architecture 100, and or any components included therein, may be performed by one or more computer devices 700 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY. or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes and functionality described above with regard to FIGS. 1-6, and herein. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

The computer 700 may include one or more hardware processors (processors) configured to execute one or more stored instructions. The processor(s) may comprise one or more cores. Further, the computer 700 may include one or more network interfaces configured to provide communications between the computer 700 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for elastically scaling additional workload capacity in and out of a cloud-computing network for on-premise enterprise workloads based on increases or decreases in demand.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    running a first workload on one or more devices of an enterprise edge network;
    determining that a capacity associated with the first workload meets or exceeds a threshold capacity;
    receiving, from a client device and at the one or more devices of the enterprise edge network, a request to establish a connection between the client device and the first workload; and
    based at least in part on the capacity meeting or exceeding the threshold capacity, redirecting, by an orchestration system associated with the enterprise edge network, the client device to establish the connection with a second workload that is a facsimile of the first workload, the second workload hosted on a cloud computing network that is remote from the enterprise edge network.

2. The method of claim 1, further comprising:
    determining that the capacity associated with the first workload is less than the threshold capacity; and
    based at least in part on the capacity being less than the threshold capacity, causing the connection to be established between the client device and the first workload.

3. The method of claim 1, further comprising:
    determining that the capacity associated with the first workload is less than the threshold capacity; and
    based at least in part on the capacity being less than the threshold capacity, causing new connections to be established between client devices and the first workload while maintaining the connection between the client device and the second workload hosted on the cloud computing network.

4. The method of claim 1, further comprising:
obtaining, by the orchestration system, configuration data indicating a configuration associated with the first workload; and
based at least in part on the capacity meeting or exceeding the threshold capacity, spinning up, by the orchestration system, the second workload on resources of the cloud computing network, wherein the configuration associated with the first workload is replicated by the orchestration system in the second workload based at least in part on the configuration data.

5. The method of claim 4, wherein the configuration data is indicative of a networking policy associated with the first workload.

6. The method of claim 1, wherein the connection is at least one of a virtual private network (VPN) connection, a Zero Trust Networking (ZTN) connection, a reverse proxy connection, or a forward proxy connection, and wherein the first workload and the second workload are associated with a security function.

7. The method of claim 1, further comprising receiving, at the enterprise edge network and from the second workload hosted on the cloud-computing network, a portion of traffic sent by the client device over the connection.

8. The method of claim 1, further comprising:
prior to determining that the capacity associated with the first workload meets or exceeds the threshold capacity, establishing another connection between another client device and the first workload; and
based at least in part on the determining that the capacity associated with the first workload meets or exceeds the threshold capacity, migrating the other connection such that the other connection is between the other client device and the second workload hosted on the cloud-computing network.

9. The method of claim 1, further comprising:
determining that a capacity associated with the second workload meets or exceeds the threshold capacity; and
based at least in part on the capacity meeting or exceeding the threshold capacity, spinning up a third workload on resources of the cloud computing network, the third workload being a facsimile of at least one of the first workload or the second workload.

10. The method of claim 1, wherein determining that the capacity meets or exceeds the threshold capacity comprises:
receiving, at a monitor of the cloud-computing network, utilization data indicating a utilization history associated with the first workload;
receiving, at the monitor, capacity data indicating the capacity associated with the first workload; and
determining, by the monitor and based at least in part on the utilization data and the capacity data, that the capacity meets or exceeds the threshold capacity.

11. The method of claim 10, wherein the monitor determines that the capacity meets or exceeds the threshold capacity at least partially using machine-learning techniques.

12. A system comprising:
one or more processors; and
one or more non-transitory computer-readable media storing instructions that, when executed, cause the one or more processors to perform operations comprising:
determining that a capacity associated with a secure access node of an enterprise edge network meets or exceeds a threshold capacity;
based at least in part on the capacity meeting or exceeding the threshold capacity, causing a facsimile of the secure access node to be hosted on resources of a cloud-computing network that is remote from the enterprise edge network; and
at least one of:
redirecting, by an orchestration system associated with the enterprise edge network, a connection request received from a first client device such that a first connection is established between the first client device and the facsimile of the secure access node; or
migrating, by the orchestration system associated with the enterprise edge network, an existing connection between a second client device and the secure access node such that a second connection is established between the second client device and the facsimile of the secure access node.

13. The system of claim 12, the operations further comprising:
determining that the capacity associated with the secure access node is less than the threshold capacity; and
based at least in part on the capacity being less than the threshold capacity, migrating the at least one of the first connection or the second connection from the cloud-computing network to the secure access node of the enterprise edge network.

14. The system of claim 12, the operations further comprising:
determining that the capacity associated with the secure access node is less than the threshold capacity; and
based at least in part on the capacity being less than the threshold capacity, causing a new connection to be established between a third client device and the secure access node while maintaining the at least one of the first connection between the first client device and the facsimile of the secure access node or the second connection between the second client device and the facsimile of the secure access node.

15. The system of claim 12, wherein at least one of a configuration or a networking policy associated with the secure access node is replicated on the facsimile of the secure access node.

16. The system of claim 12, wherein at least one of the first connection or the second connection is at least one of a virtual private network (VPN) connection, a Zero Trust Networking (ZTN) connection, a reverse proxy connection, or a forward proxy connection.

17. The system of claim 12, the operations further comprising:
storing utilization data indicative of a utilization history associated with the secure access node; and
receiving capacity data indicating the capacity associated with the secure access node at a present time,
wherein determining that the capacity meets or exceeds the threshold capacity is based at least in part on the utilization data and the capacity data.

18. One or more non-transitory computer-readable media storing instructions that, when executed, cause one or more processors to perform operations comprising:
determining that a capacity associated with a secure access node of an enterprise edge network meets or exceeds a threshold capacity;
based at least in part on the capacity meeting or exceeding the threshold capacity, causing a facsimile of the secure access node to be hosted on resources of a cloud-computing network that is remote from the enterprise edge network; and at least one of:

redirecting, by an orchestration system associated with the enterprise edge network, a connection request received from a first client device such that a first connection is established between the first client device and the facsimile of the secure access node; or migrating, by the orchestration system associated with the enterprise edge network, an existing connection between a second client device and the secure access node such that a second connection is established between the second client device and the facsimile of the secure access node.

19. The one or more non-transitory computer-readable media of claim 18, the operations further comprising:

determining that the capacity associated with the secure access node is less than the threshold capacity; and based at least in part on the capacity being less than the threshold capacity, migrating the at least one of the first connection or the second connection from the cloud-computing network to the secure access node of the enterprise edge network.

20. The one or more non-transitory computer-readable media of claim 18, the operations further comprising:

determining that the capacity associated with the secure access node is less than the threshold capacity; and based at least in part on the capacity being less than the threshold capacity, causing a new connection to be established between a third client device and the secure access node while maintaining the at least one of the first connection between the first client device and the facsimile of the secure access node or the second connection between the second client device and the facsimile of the secure access node.

* * * * *